United States Patent
Ono et al.

(10) Patent No.: US 10,093,319 B2
(45) Date of Patent: Oct. 9, 2018

(54) VARIABLE SPEED CONTROL SYSTEM

(71) Applicant: HONDA MOTOR CO., LTD., Minato-Ku, Tokyo (JP)

(72) Inventors: Junya Ono, Wako (JP); Yoshiaki Nedachi, Wako (JP); Hiroyuki Kojima, Wako (JP); Tatsuya Ryuzaki, Wako (JP); Kosuke Tsunashima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 57 days.

(21) Appl. No.: 15/447,993

(22) Filed: Mar. 2, 2017

(65) Prior Publication Data
US 2017/0267250 A1 Sep. 21, 2017

(30) Foreign Application Priority Data
Mar. 18, 2016 (JP) ................................. 2016-054609

(51) Int. Cl.
*B60W 10/02* (2006.01)
*B60W 10/06* (2006.01)
(Continued)

(52) U.S. Cl.
CPC ............ *B60W 30/19* (2013.01); *B60W 10/02* (2013.01); *B60W 10/11* (2013.01);
(Continued)

(58) Field of Classification Search
CPC ...... B60W 10/02; B60W 10/06; B60W 10/11; B60W 30/19; B60W 2300/36; F16H 63/502
See application file for complete search history.

(56) References Cited

U.S. PATENT DOCUMENTS

2008/0119324 A1 5/2008 Watanabe
2012/0253624 A1* 10/2012 Maruyama .............. F02D 11/02
                                                                701/70
(Continued)

FOREIGN PATENT DOCUMENTS

JP 2005-106246 A 4/2005

OTHER PUBLICATIONS

Extended European search report dated Aug. 14, 2017 in the corresponding EP patent application 17158849.4.

*Primary Examiner* — Edwin A Young
(74) *Attorney, Agent, or Firm* — Carrier Blackman & Associates, P.C.; Joseph P. Carrier; William D. Blackman

(57) ABSTRACT

A variable speed control system includes a multiple-speed transmission which changes a speed of an engine output in multiple stages based on a change in meshing state of a dog clutch which is caused in association with an operation of a change pedal connected mechanically, a pedal load detection device which detects an operation load of the change pedal, and a control unit which suppresses or shuts off an engine output to the multiple-speed transmission and permits a speed change action of the multiple-speed transmission by the change pedal when a detected pedal load exceeds a pedal load threshold. The variable speed control system further includes an engine revolution speed detection sensor which detects an engine revolution speed. The control unit changes the pedal load threshold according to the engine revolution speed detected. Such variable speed control system can realize a stable speed change action irrespective of running conditions.

8 Claims, 7 Drawing Sheets

(51) Int. Cl.
    *B60W 10/11*         (2012.01)
    *B60W 30/19*         (2012.01)
    *F16H 63/50*         (2006.01)
    *F16H 61/04*         (2006.01)
    *F16H 59/36*         (2006.01)

(52) U.S. Cl.
    CPC ....... *F16H 61/0437* (2013.01); *F16H 63/502* (2013.01); *B60W 2300/36* (2013.01); *B60W 2510/0604* (2013.01); *B60W 2510/0638* (2013.01); *B60W 2710/021* (2013.01); *B60W 2710/1005* (2013.01); *B60Y 2200/12* (2013.01); *F16H 2059/366* (2013.01); *F16H 2061/0474* (2013.01)

(56) References Cited

U.S. PATENT DOCUMENTS

2013/0225367 A1*   8/2013   Dietzel ................ B60W 10/06
                                                          477/97
2014/0256507 A1    9/2014   Sakamoto
2014/0365054 A1*  12/2014   Yamamoto ............ F02D 41/065
                                                           701/22

\* cited by examiner

VARIABLE SPEED CONTROL SYSTEM

CROSS-REFERENCE TO RELATED APPLICATION

This application claims priority from Japanese Patent Application No. 2016-054609 filed on Mar. 18, 2016, the entire contents of which are incorporated herein by reference.

TECHNICAL FIELD

The present invention relates to a variable speed control system which is provided on a motorcycle or the like.

BACKGROUND ART

A variable speed control system is known which includes a multiple-speed transmission which changes an output of an engine in a multiple stages based on a change in meshing state of a dog clutch which is caused in association with an operation of a change pedal which is mechanically connected to the multiple-speed transmission, a pedal load detection device which detects an operation load of the change pedal, and a control unit which permits a speed change action of the multiple-speed transmission according to the change pedal by suppressing or shutting off the engine output to the multiple-speed transmission when a change pedal operation load detected by the pedal load detection device exceeds a predetermined threshold.

For example, patent literature 1 discloses a variable speed control system which permits a speed change action of a multiple-speed transmission according to a change pedal by shutting off an engine output to the multiple-speed transmission through disengagement of a main clutch when a change pedal operation load detected by a strain sensor exceeds a preset threshold. With a change speed control system like this, it is possible for the multiple-speed transmission to perform a speed change action only by operating the change pedal without operating a clutch lever.

RELATED ART LITERATURE

Patent Literature

Patent Literature 1: JP-A-2005-106246

SUMMARY OF THE INVENTION

Problem that the Invention is to Solve

In the multiple-speed transmission which is operated to change speeds by the change pedal which is mechanically connected thereto, since the feeding speed of the dog clutch depends on the operation load of the change pedal, when a vehicle is running at high speeds, the operation load of the change pedal becomes insufficient, leading to a possibility of occurrence of a so-called shallow meshing in which dog teeth of the dog clutch cannot move to bottom portions of dog holes of the next higher gear due to the insufficient change pedal operation load, whereby the dog teeth are engaged with the corresponding dog holes only at top portions thereof. There may be a case where a shallow meshing calls for a speed change action failure. In addition, there are fears that the shallow meshing triggers the damage of the top portions of the dog teeth of the dog clutch due to the concentration of excessive load thereto. Thus, it is necessary to devise countermeasures against the problem such as ensuring rigidity required or more at the portions concerned of the dog clutch or the like.

The invention has been made in view of the problem described above, and an object of the invention is to provide a variable speed control system which can realize a stable speed change action irrespective of a change in running conditions.

Means for Solving the Problem

With a view to achieving the object, according to an invention of claim 1, there is provided a variable speed control system, including:

a multiple-speed transmission which changes a speed of an engine output in multiple stages based on a change in meshing state of a dog clutch which is caused in association with an operation of a change pedal connected mechanically;

a pedal load detection device which detects an operation load of the change pedal; and a control unit which suppresses or shuts off an engine output to the multiple-speed transmission and permits a speed change action of the multiple-speed transmission by means of the change pedal when a detected load of the pedal load detection device exceeds a predetermined threshold, wherein the variable speed control system includes further an engine revolution speed detection device which detects an engine revolution speed, and wherein the control unit changes the threshold according to a detected revolution speed by the engine revolution speed detection device.

An invention according to claim 2 is such that in the variable speed control system according to claim 1, the control unit changes the threshold which is increased as the detected revolution speed of the engine revolution speed detection device rises.

An invention according to claim 3 is such that in the variable speed control system according to claim 1, the control unit changes the threshold continuously according to the detected revolution speed of the engine revolution speed detection device.

An invention according to claim 4 is such that in the variable speed control system according to claim 1, the multiple-speed transmission has a neutral position between a first gear and a second gear, and the control unit sets the threshold greater in a speed change action from the first gear to the second gear and/or in a speed change action from the second gear to the first gear than in other speed change actions.

An invention of claim 5 is such that in the variable speed control system according to claim 1, the variable speed control system further includes a throttle position detection device which detects a position of a throttle valve, and the control unit changes the threshold according to not only the detected revolution speed detected of the engine revolution speed detection device but also a detected position of the throttle position detection device.

An invention according to claim 6 is such that in the variable speed control system according to claim 1, in shutting off an engine output to the multiple-speed transmission by disengaging a main clutch when the detected load of the pedal load detection device exceeds the threshold, the control unit sets a second threshold which is smaller than the threshold and controls the main clutch preloaded in preparation for disengagement when the detected load of the pedal load detection device exceeds the second threshold.

An invention according to claim 7 is such that in the variable speed control system according to claim 6, the control unit engages the main clutch in an event that a speed change action of the multiple-speed transmission is not completed even though a predetermined reference time has elapsed after the main clutch is disengaged according to an operation of the change pedal.

An invention according to claim 8 is such that in the variable speed control system according to claim 7, the control unit starts counting the reference time at a timing that the detected load of the pedal load detection device exceeds the threshold.

Advantage of the Invention

According to the invention of claim 1, since the threshold of the pedal load which permits the speed change action of the multiple-speed transmission is changed according to the engine revolution speed, a speed change based on a light pedal load (good operability) and a speed change based on a heavy pedal load (to suppress the occurrence of shallow meshing) can be selectively used according to running conditions, as a result of which it is possible to realize a stable speed change action irrespective of running conditions.

According to the invention of claim 2, since the threshold of the pedal load which permits a speed change action of the multiple-speed transmission increases as the engine revolution speed rises, the operability can be improved without increasing the threshold of the pedal load when the vehicle is running at low speeds, while when the vehicle is running at high speeds, the threshold of the pedal load can be increased to suppress the occurrence of shallow meshing of the dog clutch.

According to the invention of claim 3, since the threshold of the pedal load which permits a speed change action of the multiple-speed transmission is changed continuously according to the engine revolution speed, when compared with a case where the pedal load is changed step by step, the sensation of physical disorder the rider is caused to feel by a change in pedal load can be reduced, whereby the good operability and the stable shift action can be made compatible with each other.

According to the invention of claim 4, since the pedal load is increased greater when the speed change action from the first gear to the second gear or the speed change action from the second gear to the first gear takes place than when the other speed change actions take place, it is possible to suppress a risk of the transmission being shifted in the neutral position unintentionally.

According to the invention of claim 5, since the threshold of the pedal load which permits a speed change action of the multiple-speed transmission is changed according to the position of the throttle valve which changes earlier than the engine revolution speed, for example, in acceleration where the position of a throttle valve is shifted to a wide open position, the pedal load can be increased to a heavy load in anticipation of an increase in engine revolution speed to thereby suppress the occurrence of shallow meshing of the dog clutch.

According to the invention of claim 6, in disengaging the main clutch according to the threshold of the pedal load which permits a speed change action of the multiple-speed transmission, since the main clutch is controlled to be preloaded for disengagement before the main clutch is actually disengaged, the main clutch can be disengaged quickly to enable a quick speed change action of the multiple-speed transmission.

According to the invention of claim 7, since the main clutch is engaged in the event that the speed change action is not completed even though the predetermined reference time has elapsed after the main clutch is disengaged, the clutch disengagement time which will be brought about in the case of a speed change error can be shortened to thereby reduce the sensation of free running.

According to the invention of claim 8, since the speed change error determination time is started to be counted based not on the threshold of the pedal load which triggers the start of preloading control of the main clutch but on the threshold of the pedal load which triggers the start of disengagement of the main clutch, it is possible to prevent the determination of a speed change error from being made erroneously when the vehicle is running at low speeds where a speed change action is performed slowly.

MODE FOR CARRYING OUT THE INVENTION

Figure 1:
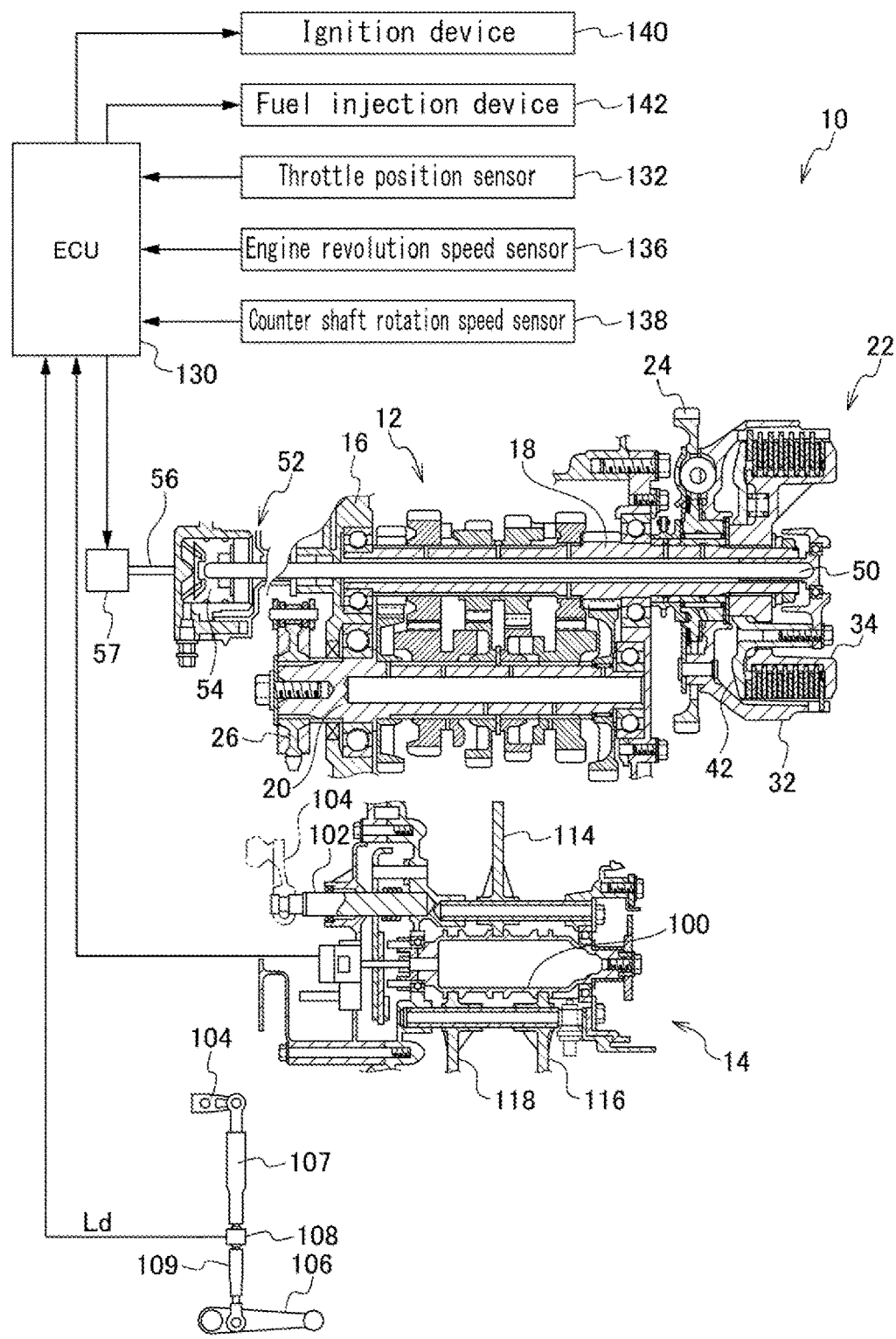
FIG. 1 is a block diagram showing the configuration of a variable speed control system according to an embodiment of the invention.

Hereinafter, an embodiment of a variable speed control system of the invention will be described based on the accompanying drawings. The drawings should be seen in a direction in which given reference numerals look proper.

Figure 2:
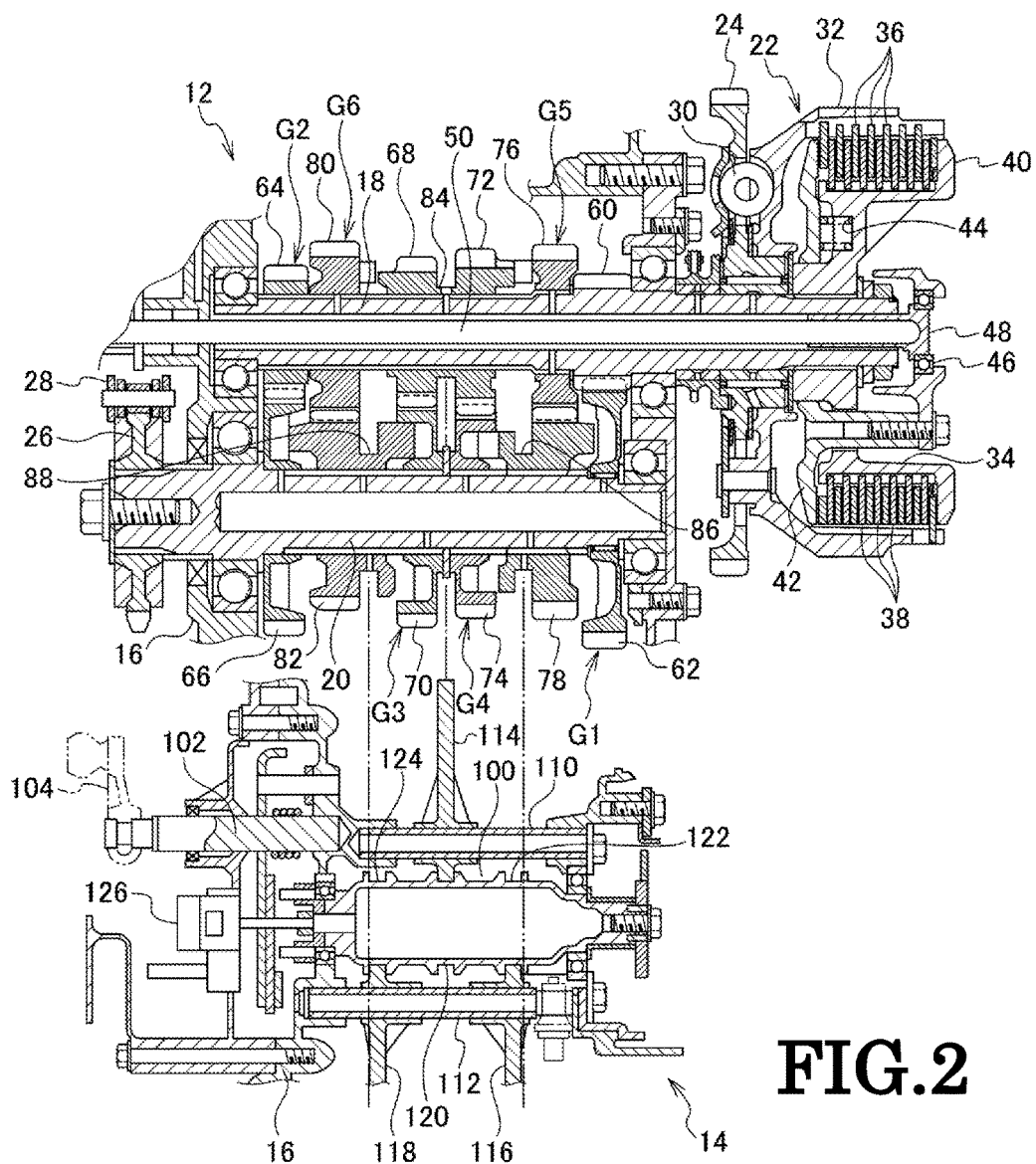
FIG. 2 is an enlarged sectional view showing a transmission and a transmission mechanism which are shown in FIG. 1.

FIG. 1 is a block diagram of a variable speed control system 10 according to an embodiment of the invention, and FIG. 2 is an enlarged sectional view of a transmission 12 and a transmission mechanism 14 which are shown in FIG. 1. The transmission 12 applied to a motorcycle includes first to sixth speed gears G (G1 to G6) between a main shaft 18 as an input shaft and a counter shaft 20 as an output shaft which have axes which are parallel to each other and which are supported rotatably in an engine case 16. This counter shaft 20 rotates in synchronization with the rotation of a rear wheel (whose illustration is omitted) as a drive wheel.

A main clutch 22 is provided between the main shaft 18 of the transmission 12 and a crankshaft (whose illustration is omitted) of an engine, not shown, which is a drive source, and this main clutch 22 shuts off the transmission of a rotational driving force of the engine. The rotational driving force of the engine is transmitted from a primary driven gear 24 which meshes with a primary drive gear, not shown, which is fixed to the crankshaft to the main shaft 18 by way of the main clutch 22.

The rotational driving force transmitted to the main shaft 18 is transmitted to the counter shaft 20 by way of one gear G which is selected by the transmission mechanism 14, which will be described later. A drive sprocket 26 is fixed to one end portion of the counter shaft 20, and the rotational driving force from the engine is transmitted to the rear wheel via a chain 28 which is wrapped around the drive sprocket 26.

The main clutch 22 includes a clutch outer 32 to which power is transmitted from the crankshaft by way of the primary driven gear 24 and a torque damper 30, a clutch inner 34 which is disposed in a central portion of the clutch outer 32 and which is connected to the main shaft 18, a plurality of drive friction plates 36 which are spline fitted in an inner circumferential wall of the clutch outer 32 so as to slide in an axial direction, a plurality of driven friction plates 38 which are alternately superposed on the drive friction plates 36 and which are spline fitted on an outer circumference of the clutch inner 34 so as to slide in the axial direction, a pressure bearing plate 40 which is provided integrally with an outer end of the clutch inner 34 so as to be in abutment with an outermost (rightmost in the figures) drive friction plate 36, a pressure applying plate 42 which is slidably attached to an inner end of the clutch inner 34 so as to press an innermost drive friction plate 36, and a clutch spring 44 which biases the pressure applying plate 42 in a direction in which the pressure applying plate 42 moves away from the pressure bearing plate 40 (in a leftward direction in the figures). Namely, in this embodiment, the main clutch 22 adopts a normally open clutch which is kept disengaged in a normal state, and this normally open state is produced by causing the pressure applying plate 42 to move away from the pressure bearing plate 40 by means of a biasing force of the clutch spring 44. However, the main clutch 22 may adopt a normally closed clutch which is kept engaged in a normal state.

A release member 48 is disposed in a central portion of the clutch inner 34 with a release bearing 46 interposed between the pressure bearing plate 40 and itself. A push rod 50, which is inserted into the main shaft 18 so as to move in the axial direction, is connected to the release member 48. When the push rod 50 is pushed by means of a force which resists an elastic spring force of the clutch spring 44 to thereby slide in a rightward direction in the figures, the pressure applying plate 42 moves in a direction in which the pressure applying plate 42 holds the drive friction plates 36 and the driven friction plates 38 between the pressure receiving plate 40 and itself. This engages the main clutch 22, whereby the clutch outer 32 and the clutch inner 34 are brought into frictional connection with each other, so that the rotational driving force of the engine can be transmitted. As this occurs, a partial clutch engagement which is an intermediate state between an engaged state and a disengaged state can also be obtained by controlling a pressing force that is applied to the push rod 50. The push rod 50 is in abutment with an end portion of a hydraulic piston 54 of a clutch slave cylinder 52 which is fixed to the engine case 16, whereby the hydraulic piston 54 pushes the push rod 50 in the rightward direction in the figures as a result of a predetermined hydraulic pressure being supplied into a fluid path 56. The other end of the fluid path 56 is connected to a clutch valve 57, and the predetermined hydraulic pressure is supplied to the fluid path 56 based on a pressure control executed by the clutch valve 57.

The first speed gear G1 is made up of a first speed change drive gearwheel 60 which is formed integrally on the main shaft 18 and a first speed change driven gearwheel 62 which is mounted on the counter shaft 20 so as to rotate relatively and which meshes with the first speed change drive gearwheel 60. The second speed gear G2 is made up of a second speed change drive gearwheel 64 which is mounted on the main shaft 18 and a second speed change driven gearwheel 66 which is mounted on the counter shaft 20 so as to rotate relatively and which meshes with the second speed change drive gearwheel 64. The third speed gear G3 is made up of a third speed change drive gearwheel 68 which is mounted on the main shaft 18 and a third speed change driven gearwheel 70 which is mounted on the counter shaft 20 so as to rotate relatively and which meshes with the third speed change drive gearwheel 68.

The fourth speed gear G4 is made up of a fourth speed change drive gearwheel 72 which is mounted on the main shaft 18 and a fourth speed change driven gearwheel 74 which is mounted on the counter shaft 20 so as to rotate relatively and which meshes with the fourth speed change drive gearwheel 72. The fifth speed gear G5 is made up of a fifth speed change drive gearwheel 76 which is mounted on the main shaft 18 so as to rotate relatively and a fifth speed change driven gearwheel 78 which is mounted on the counter shaft 20 and which meshes with the fifth speed change drive gearwheel 76. The sixth speed gear G6 is made up of a sixth speed change drive gearwheel 80 which is mounted on the main shaft 18 so as to rotate relatively and a sixth speed change driven gearwheel 82 which is mounted on the counter shaft 20 and which meshes with the sixth speed change drive gearwheel 80.

A 5-6 speed changing shifter 84 is spline fitted on the main shaft 18 between the fifth speed change drive gearwheel 76 and the sixth speed change drive gearwheel 80 so as to sling in the axial direction. The third speed change drive gearwheel 68 is formed integrally with the 5-6 speed changing shifter 84 so as to face the sixth speed change drive gearwheel 80, and the fourth speed change drive gearwheel 72 is formed integrally with the 5-6 speed changing shifter 84 so as to face the fifth speed change drive gearwheel 76.

A 1-4 speed changing shifter 86, with which the fifth speed change driven gearwheel 78 is formed integrally between the first speed change driven gear wheel 62 and the fourth speed change driven gear wheel 74, is spline fitted on the counter shaft 20 so as to slide in the axial direction. A 2-3 speed changing shifter 88, with which the sixth speed change driven gearwheel 82 is formed integrally between the second speed change driven gear wheel 66 and the third speed change driven gear wheel 70, is spline fitted on the counter shaft 20 so as to slide in the axial direction.

When the 5-6 speed changing shifter 84 is caused to slide in the axial direction so as to be brought into engagement with the fifth speed change drive gearwheel 76, the fifth speed change drive gearwheel 76 is connected to the main shaft 18 via the 5-6 speed changing shifter 84 so as not to rotate relatively, whereby the gear G5 is selected as the gear G which transmits the rotational driving force. On the other hand, when the 5-6 speed changing shifter 84 is caused to slide in the axial direction so as to be brought into engagement with the sixth speed change drive gearwheel 80, the sixth speed change drive gearwheel 80 is connected to the main shaft 18 via the 5-6 speed changing shifter 84 so as not to rotate relatively, whereby the gear G6 is selected as the gear G which transmits the rotational driving force.

When the 1-4 speed changing shifter 86 is caused to slide in the axial direction so as to be brought into engagement with the first speed change driven gearwheel 62, the first speed change driven gearwheel 62 is connected to the counter shaft 20 via the 1-4 speed changing shifter 86 so as not to rotate relatively, whereby the gear G1 is selected as the gear G which transmits the rotational driving force. On the other hand, when the 1-4 speed changing shifter 86 is caused to slide in the axial direction so as to be brought into engagement with the fourth speed change driven gearwheel 74, the fourth speed change driven gearwheel 74 is connected to the counter shaft 20 via the 1-4 speed changing shifter 86 so as not to rotate relatively, whereby the gear G4 is selected as the gear G which transmits the rotational driving force.

When a 2-3 speed changing shifter 88 is caused to slide in the axial direction so as to be brought into engagement with the second speed change driven gearwheel 66, the second speed change driven gearwheel 66 is connected to the counter shaft 20 via the 2-3 speed changing shifter 88 so as not to rotate relatively, whereby the gear G2 is selected as the gear G which transmits the rotational driving force. On the other hand, when the 2-3 speed changing shifter 88 is caused to slide in the axial direction so as to be brought into engagement with the third speed change driven gearwheel 70, the third speed change driven gearwheel 70 is connected to the counter shaft 20 via the 2-3 speed changing shifter 88 so as not to rotate relatively, whereby the gear G3 is selected as the gear G which transmits the rotational driving force.

The engagement of the 5-6 speed changing shifter 84 with the fifth speed change drive gearwheel 76 or the sixth speed change drive gear wheel 80 which lies adjacent thereto, the engagement of the 1-4 speed changing shifter 86 with the first speed change driven gearwheel 62 or the fourth speed change driven gearwheel 74 and the engagement of the 2-3 speed changing shifter 88 with the second speed change drive gearwheel 66 or the third speed change driven gearwheel 70 are executed by dog clutches 90 which are provided between the shifters and the gearwheels.

Figure 3:
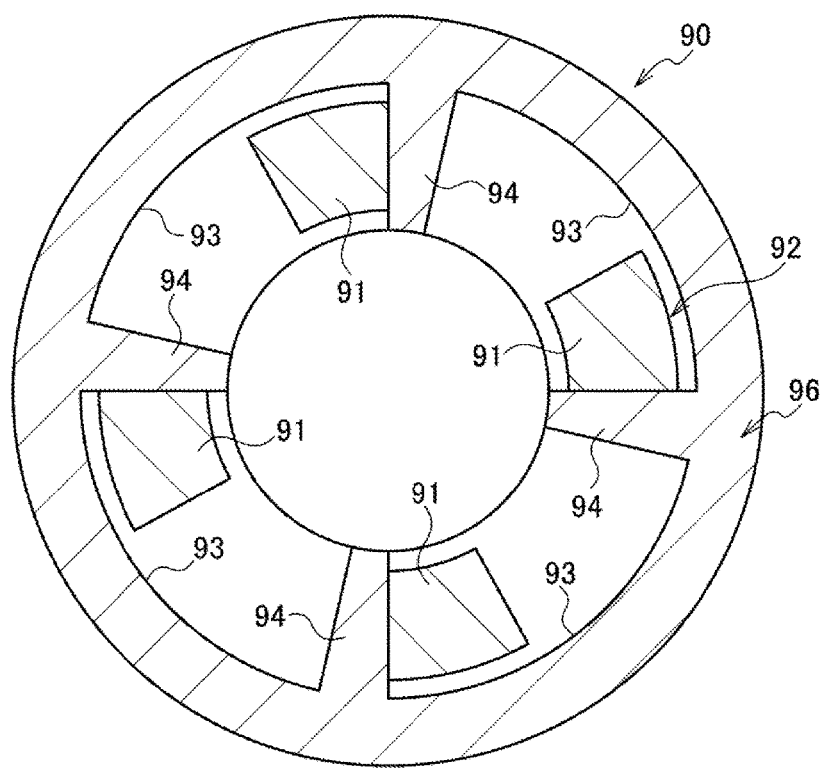
FIG. 3 is a sectional view showing the configuration of a dog clutch.

As shown in FIG. 3, the dog clutch 90 is made up of a dog 92 having four dog teeth 91 and a dog 96 having dowel pillars 94 which define dog holes 93. In the case of the dog 92 being provided on the shifter, the dog 96 is provided on the gearwheel which is brought into engagement with the shifter. FIG. 3 shows the dog clutch 90 resulting when the dog clutch 90 is seen from the axial direction of the main shaft 18 or the counter shaft 20. The dog clutch 90 is a general mechanism which transmits a rotational driving force between gearwheels which lie adjacent to each other on one shaft through meshing engagement of the dog teeth 91 with the dowel pillars 94 in the axial direction. In this embodiment, the dog 92 will be referred to as a drive dog which is connected to the main shaft 18, and the dog 96 will be referred to as a driven dog which is connected to the counter shaft 20 and which meshes with the drive dog 92 to be driven.

Returning to FIGS. 1 and 2, the transmission mechanism 14 which selects one gear G which transmits the rotational driving force is accommodated in the interior of the engine case 16 as the transmission 12 is done. The transmission mechanism 14 executes a speed changing operation by a rider operating a change pedal 106 which is attached to a body of the motorcycle so as to be oscillated to thereby rotate a shift drum 100 by means of an operation force (a pedal load) which is exerted when the rider operates the change pedal. In this embodiment, the change pedal 106, which is operated by a left foot of the rider, is connected to a shift lever 104 which is fixed to an end portion of a shift spindle 102. There are provided between the change pedal 106 and the shift lever 104 a connecting member 109 which is connected to the change pedal 106, an accumulator 107 which is connected to the shift lever 104, and a pedal load sensor 108 which is interposed between the connecting member 109 and the accumulator 107 to detect an operation load of the change pedal 106. The pedal load sensor 108 of this embodiment is made up of a strain sensor which detects a strain of the connecting member 109 which corresponds to a pedal load applied to the change pedal 106.

Three engaging grooves 120, 122, 124 are formed on a surface of the hollow cylindrical shift drum 100 having an axis which is parallel to a first sift fork shaft 110 and a second shift fork shaft 112, and these engaging grooves 120, 122, 124 are brought into engagement with ends of a first shift fork 114, a second shift fork 116 and a third shift fork 118, respectively. The first shift fork shaft 110 and the second shift fork shaft 112 have axes which are parallel to the main shaft 18 and the counter shaft 20 and are supported in the engine cage 16. The first shift fork 114 is supported on the first shift fork shaft 110 so as to slide in the axial direction, and the second shift fork 116 and the third shift fork 118 are supported on the second shift fork 112 so as to slide in the axial direction.

The other ends of the first shift fork 114, the second shift fork 116 and the third shift fork 118 are brought into engagement with the 5-6 speed changing shifter 84, 1-4 speed changing shifter 86 and the 2-3 speed changing shifter 88, respectively, which are attached to the main shaft 18 or the counter shaft 20 so as to slide in the axial direction.

The engaging grooves 120, 122, 124 on the shift drum 100 are formed so as to define positions of the first shift fork 114, the second shift fork 116 and the third shift fork 118 on the first shift fork shaft 110 and the second shift fork shaft 112 according to a rotational position of the shift drum 100. Then, when the shift drum 100 rotates, the first shift fork 114, the second shift fork 116 and the third shift fork 118 slide (are displaced) to predetermined axial positions which correspond to their related variable speed gears, so that the meshing states of the dog clutches 90 which are provided between the shifters and the gearwheels which lie adjacent to the shifters are changed. This selectively changes the variable speed gears G which transmit the rotational driving force of the engine, whereby required speed changing actions are executed.

A gear position sensor 126 is provided in the transmission mechanism 14 as a rotation angle detection device which detects a rotation angle of the shift drum 100. Namely, since the variable speed gears G are changed which are selected for engagement according to a rotational angle of the shift drum 100, the currently selected gear G (the gear position) can be detected by detecting the rotation angle of the shift drum 100.

The variable speed control system 10 includes further an ECU 130, a throttle position sensor 132 which detects a position De of a throttle valve, not shown, of the engine which rotates according to a throttle operation by the rider, an engine revolution speed sensor 136 which detects an engine revolution speed Ne which is a revolution speed of the engine, a counter shaft rotation speed sensor 138 which detects a rotation speed of the counter shaft 20, and an ignition device 140 and a fuel injection device (a fuel injector) 142 which are provided on the engine. Since a ratio of the rotation speed of the counter shaft 20 to the rotation speed of the rear wheel is 1:1, the counter shaft rotation speed sensor 138 may be provided on the rear wheel. In this case, the counter shaft rotation speed sensor 138 detects a rotation speed of the counter shaft 20 by detecting a rotation speed of the rear wheel.

The ECU 130 controls not only the main clutch 22 via the clutch valve 57 but also the engine via the ignition device 140 and the fuel injection device 142 based on detection signals from the throttle position sensor 132, the engine revolution speed sensor 136, the counter shaft rotation speed sensor 138, the pedal load sensor 108 and the gear position sensor 126.

The variable speed control system 10 of this embodiment is made to control the main clutch 22 and the output of the engine so that the transmission 12 can be operated to change speeds or gear ratios only by operating the change pedal 106 without operating a clutch lever. Specifically, a speed change operation in the transmission 12 by the change pedal 106 is permitted based on an engine cooperative change control which is applied to an upshifting operation of the change pedal 106 in acceleration and a clutch cut change control which is applied to a downshifting operation of the change pedal 106 in acceleration and deceleration when the change pedal 106 is operated for upshifting.

In principle, the ECU 130 controls the output of the engine based on a throttle position De which is calculated by the throttle position sensor 132, an engine revolution speed Ne which is detected by the engine revolution speed sensor 136 and the like. Namely, the ECU 130 controls a fuel injection amount and a fuel injection timing by the fuel injection device 142 and an ignition timing by the ignition device 140.

The ECU 130 determines that the change pedal 106 has triggered a speed change operation when a pedal load Ld which is a load detected by the pedal load sensor 108 exceeds a predetermined pedal load threshold Lt and executes the engine cooperative change control or the clutch cut change control. In the engine cooperative change control, the output of the engine is controlled to permit a speed change operation by means of the change pedal 106 to be performed in the transmission 12 without disengaging the main clutch 22. This engine output control is executed, for example, by retarding the fuel injection timing (hereinafter, referred to as a retarding operation as required), by reducing the number of cylinders of the engine in operation or by prohibiting the ignition by the ignition device 140 or the fuel injection by the fuel injection device 142 (hereinafter, referred to as an FI cutting operation as required). Then, after the speed change action of the transmission 12 has been completed, the ECU 130 releases this output control of the engine and restores its normal engine output control. In the clutch cut change control, the main clutch 22 is disengaged to permit a speed change operation by means of the change pedal 106 to take place in the transmission 12 and the main clutch 22 is engaged after the speed change operation has been completed.

Figure 4:
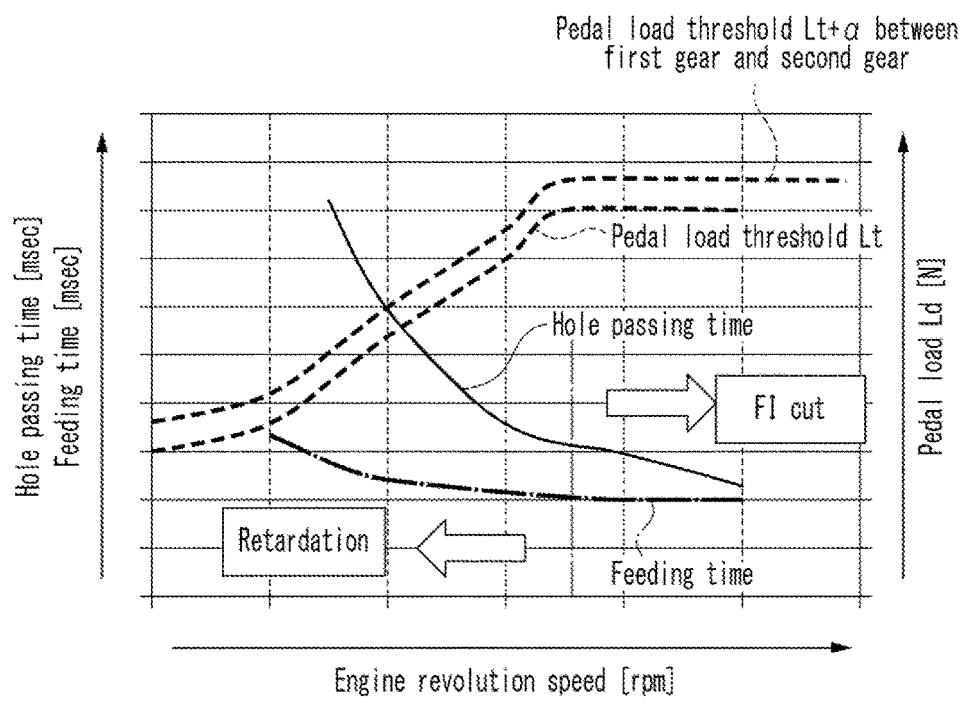
FIG. 4 is a chart showing a relationship of engine revolution speed, pedal load threshold, hole passing time and feeding time.

In the engine cooperative change control of this embodiment, as shown in FIG. 4, in a lower or slower engine revolution speed area, the retarding operation is executed to give precedence to the restoration of the engine output after the change speed action has been completed. In a higher or faster engine revolution speed area, the FI cutting operation is executed to give precedence to the reduction of a rotation difference between the drive dog 92 and the driven dog 96 of the dog clutch 90. However, as long as the output of the engine is controlled, there is imposed no limitation on the method of operation.

FIG. 4 is a chart showing a relationship of engine revolution speed Ne, pedal load threshold Lt, hole passing time Ta and feeding time Tb. The hole passing time Ta denotes a moving time in a rotating direction which is necessary for the dog teeth 91 of the drive dog 92 to pass through the dog holes 93 of the driven dog 96 of the dog clutch 90 in a speed change action of the transmission 12, and the hole passing time Ta becomes shorter as the engine revolution speed Ne becomes faster. The feeding time Tb denotes a moving time in the axial direction which is necessary for dog teeth 91 of the drive dog 92 to reach bottom portions of the dog hole 93 of the driven dog 96 of the dog clutch 90 in a speed change action of the transmission 12, and in the event that the operation load of the change pedal 106 is constant, the feeding time Tb is also constant. In the case of the feeding time Tb being constant, however, when the engine revolution speed Ne increases or becomes faster, there is caused a possibility that the hole passing time Ta becomes shorter than the feeding time Tb. In these circumstances, the dog teeth 91 of the dog clutch 90 cannot move as far as bottom portions of dog holes 93 of the next faster speed gear, resulting in fears that a shallow meshing is brought about in which the dog teeth 91 are brought into engagement with the dog holes 93 only at top portions thereof.

Figure 5:
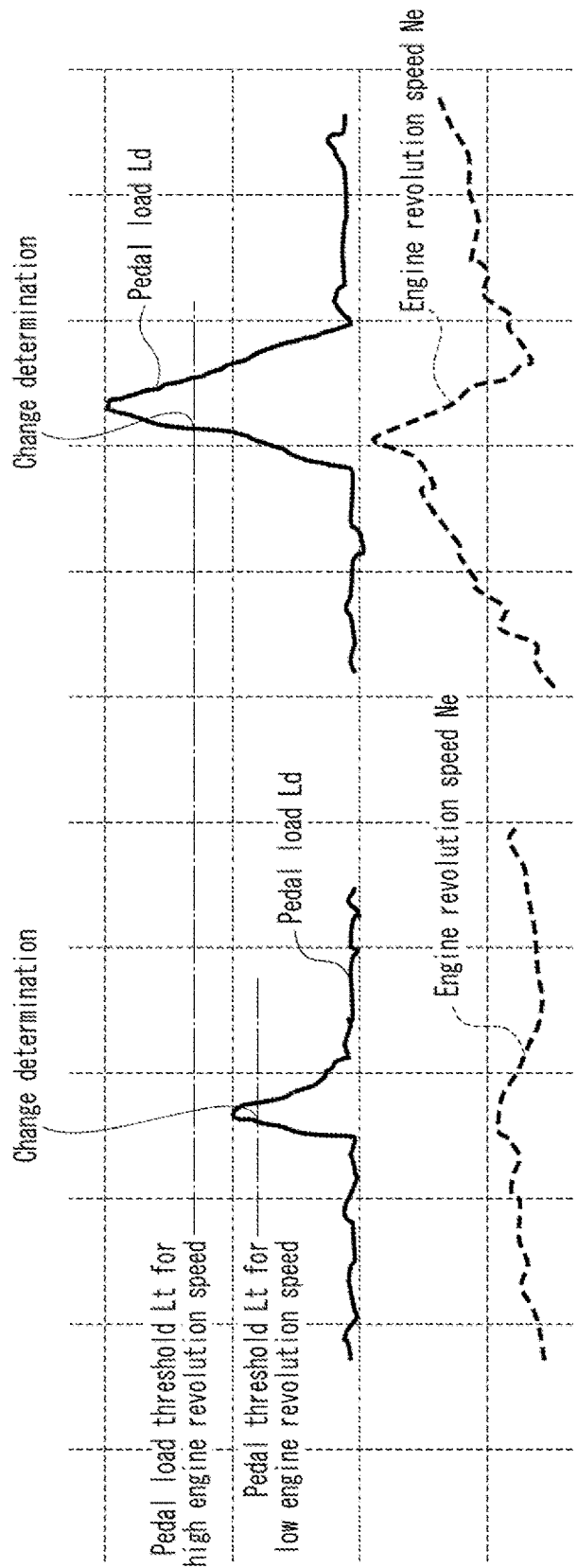
FIG. 5 is a chart showing changes in pedal load threshold according to engine revolution speed.

As shown in FIGS. 4 and 5, the ECU 130 of this embodiment changes the pedal load threshold Lt continuously in such a way that the pedal load threshold Lt becomes greater as the engine revolution speed Ne becomes faster. By doing so, since the feeding time Tb becomes shorter as the engine revolution speed Ne becomes faster, the feeding time Tb always becomes shorter than the hole passing time Ta irrespective of the engine revolution speed Ne, thereby making it possible to suppress the occurrence of shallow meshing. In addition, while the vehicle is running at low speeds where the engine revolution speed Ne becomes slower, the pedal load threshold Lt is also reduced, whereby a light and quick speed change operation can be effected due to a light pedal load. In this embodiment, although the pedal load threshold Lt is kept constant in the higher or faster engine revolution speed area to avoid a risk of the pedal load threshold Lt of the change pedal 106 becoming greater than required, since the extent to which the hole passing time Ta is shortened gets limited by the FI cutting operation described above, even though the feeding time Tb becomes constant according to the constant pedal load threshold Lt, the occurrence of shallow meshing is suppressed.

In a speed change pattern of the transmission 12 by the change pedal 106, in the case of the neutral position being set between the first gear and the second gear, the ECU 130 of this embodiment can increase the pedal load threshold Lt greater when a speed change action from the first gear to the second gear and a speed change action from the second gear to the first gear take place than when other speed change actions take place. By doing so, when the speed change action from the first gear to the second gear or the speed change action from the second gear to the first gear takes place, it is possible to prevent the transmission 12 from being shifted into the neutral position unintentionally.

In addition, the ECU 130 of this embodiment can change the pedal load threshold Lt according to not only the engine revolution speed Ne but also the throttle position De. By doing so, for example, in acceleration where the throttle position De increases in terms of opening angle, since the pedal load threshold Lt becomes heavy in anticipation of an increase in engine revolution speed Ne, it is possible to suppress the occurrence of shallow meshing in the dog clutch 90 further.

Pedal loads applied to operate the change pedal can be accumulated until the pedal load threshold Lt is reached by providing the accumulator 107 between the change pedal 106 and the shift lever 104, whereby a greater pedal load can be obtained, thereby facilitating a gear change while the vehicle is running at high speeds.

Figure 6:
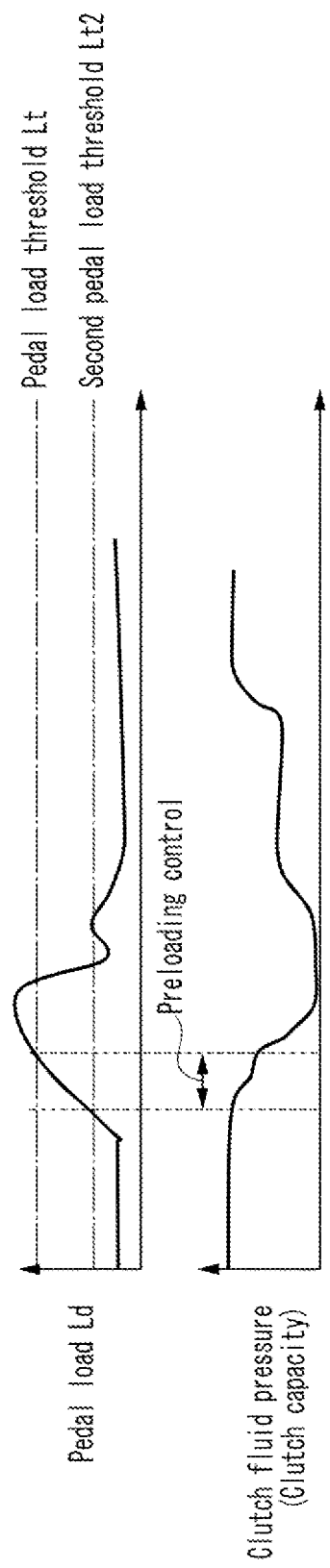
FIG. 6 is a timing chart showing a preloading control of a main clutch.

FIG. 6 is a timing chart showing a preloading control of the main clutch 22. As shown in the figure, in shutting off the engine output to the transmission 12 by disengaging the main clutch 22 when the pedal load Ld of the change pedal 106 exceeds the pedal load threshold Lt, the ECU 130 of this embodiment sets a second pedal load threshold Lt2 which is smaller than the pedal load threshold Lt, whereby the ECU 130 can control the main clutch 22 so as to be preloaded for disengagement when the pedal load Ld exceeds the second pedal load threshold Lt2. By doing so, in disengaging the main clutch 22 according to the pedal load Ld, as a result of the main clutch 22 being controlled to be preloaded for disengagement before the main clutch 22 is actually disengaged, the main clutch 22 can be disengaged quickly when needed, the time required for the speed change action can be shortened.

Further, the ECU 130 of this embodiment can engage the main clutch 22 in the event that the speed change action of the transmission 12 is not completed even though a predetermined reference time T has elapsed after the main clutch 22 is disengaged in response to the operation of the change pedal 106. The speed change action of the transmission 12 is determined to be completed when an angle of the shift drum 100 before a speed change action is performed differs from an angle of the shift drum 100 after the speed change action has been performed, and it can be determined that a speed change error occurs when the angles of the shift drum 100 before and after the speed change action do not differ to remain the same. Then, in the event that the speed change action is not completed even through the reference time T has elapsed after the main clutch 22 is disengaged, the main clutch 22 is engaged, and therefore, the clutch disengagement time due to the speed change error is shortened, whereby the sensation of free running is reduced. As to a counting time Td which is compared with the reference time T, it is desirable to start counting based not on the second pedal load threshold Lt2 at which the preloading control of the main clutch 22 is started but on the pedal load threshold Lt at which the disengagement of the main clutch 22 is started. By doing so, it is possible to prevent a slow speed change action which is performed while the vehicle is running at low speeds from being determined erroneously to be a speed change error.

Figure 7:
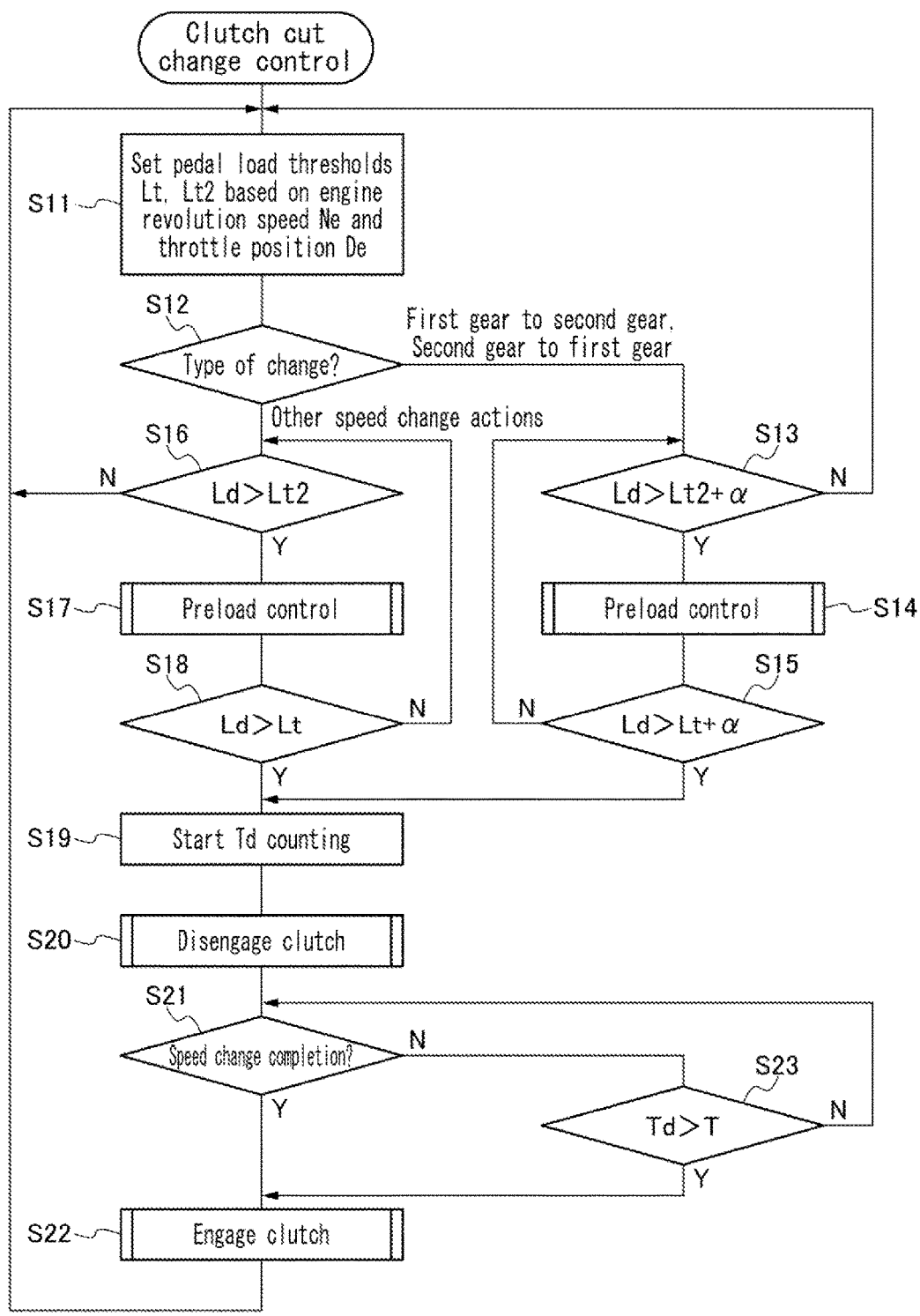
FIG. 7 is a flowchart showing a control procedure of an ECU.

Next, a control procedure of the clutch cut change control by the ECU 130 will be described by reference to FIG. 7.

In the clutch cut change control, firstly, a pedal load threshold Lt and a second pedal load threshold Lt2 are set based on a detected engine revolution speed Ne and a detected throttle position De (step S11). Next, the type of a speed change operation to be carried out is determined based on a pedal load Ld of the change pedal 106 and an angle of the shift drum 100 (step S12).

Here, if it is determined that the type of the speed change operation to be carried out is a speed change operation from the first gear to the second gear or a speed change operation from the second gear to the first gear, a corrected second pedal load threshold (Lt2+$\alpha$) in which an additional load $\alpha$ is added to the second pedal load threshold Lt2 is obtained, and it is determined whether or not the pedal load Ld exceeds the corrected second pedal load threshold (Lt2+$\alpha$) (step S13). If the result of this determination is negative or NO, the clutch cut change control returns to step S11, whereas if the result is affirmative or YES, the main clutch 22 is controlled so as to be preloaded for disengagement (step S14). Next, a corrected pedal load threshold (Lt+$\alpha$) in which the additional load $\alpha$ is added to the pedal load threshold Lt is obtained, and it is determined whether or not the pedal load Ld exceeds the corrected pedal load threshold (Lt+$\alpha$) (step S15). If the result of this determination is negative or NO, the clutch cut change control returns to step S13, whereas if the result is affirmative or YES, determining that the change pedal 106 has been operated to execute a speed change operation, the clutch cut change control proceeds to a disengaging/engaging operation of the main clutch 22.

On the other hand, if it is determined in step S12 that the type of the speed change operation to be carried out is a speed change operation other than the speed change operation from the first gear to the second gear and the speed change operation from the second gear to the first gear, it is determined whether or not the pedal load Ld exceeds the second pedal load threshold Lt2 (step S16). If the result of this determination is negative or NO, the clutch cut change control returns to step S11, whereas if the result is affirmative or YES, the main clutch 22 is controlled so as to be preloaded for disengagement (step S17). Next, it is determined whether or not the pedal load Ld exceeds the pedal load threshold Lt (step S18). If the result of this determination is negative or NO, the clutch cut change control returns to step S16, whereas if the result is affirmative or YES, determining that the change pedal 106 has been operated to execute a speed change operation, the clutch cut change control proceeds to a disengaging/engaging operation of the main clutch 22.

In the engaging/disengaging operation of the main clutch 22, firstly, the main clutch 22 is disengaged (step S20) after a counting time Td is started to be counted (step S19). Next, it is determined based on the angle of the shift drum 100 whether or not the speed change operation has been completed (step S21), and the main clutch 22 is engaged at a timing when the result of the determination becomes affirmative or YES (step S22), whereafter the clutch cut change control returns to step S11. On the other hand, with the result of the determination in step S21 being negative or NO, it is determined repeatedly whether or not the counting time Td exceeds the reference time T (step S23). If the result of the determination in step S23 becomes affirmative or YES before the result of the determination in step S21 becomes affirmative or YES, determining that a speed change error is occurring, the main clutch 22 is engaged (step S22), whereafter the clutch cut change control returns to step S11.

Thus, as has been described heretofore, according to the variable speed control system 10 of this embodiment, since the pedal threshold Lt is changed according to the engine revolution speed Ne, a speed change based on a light pedal load (good operability) and a speed change based on a heavy pedal load (to suppress the occurrence of shallow meshing) can be selectively used according to running conditions, as a result of which it is possible to realize a stable speed change action irrespective of running conditions.

In this embodiment, since the pedal load threshold Lt becomes greater as the engine revolution speed Ne becomes faster, it is possible to suppress the occurrence of shallow meshing of the dog clutch 90 while the vehicle is running at high speeds without the pedal load being increased while the vehicle is running at low speeds.

In this embodiment, since the pedal load threshold Lt is changed continuously according to the engine revolution speed Ne, when compared with a case where the pedal load threshold Lt is changed step by step, the sensation of physical disorder the rider is caused to feel by a change in pedal load threshold Lt can be reduced, whereby the good operability and the stable speed change action can be made compatible with each other.

In this embodiment, since the pedal load threshold Lt is increased greater when the speed change action from the first gear to the second gear or the speed change action from the second gear to the first gear takes place than when the other speed change actions take place, it is possible to suppress a risk of the transmission being shifted in the neutral position unintentionally.

In this embodiment, since the pedal load threshold Lt is changed according the throttle position De which changes earlier than the engine revolution speed Ne, for example, in acceleration where the throttle position De is shifted to the wide open position, the pedal load threshold Lt can be increased to a heavy load in anticipation of an increase in engine revolution speed Ne to thereby suppress the occurrence of shallow meshing of the dog clutch 90.

In this embodiment, in disengaging the main clutch 22 according to the pedal load Ld, since the main clutch 22 is controlled so as to be preloaded for disengagement before the main clutch 22 is actually disengaged, the main clutch 22 can be disengaged quickly to enable a quick speed change action to take place in the multiple-speed transmission 12.

In this embodiment, since the main clutch 22 is engaged in the event that the speed change action is not completed even though the predetermined reference time T has elapsed after the main clutch 22 is disengaged, the clutch disengagement time which will be brought about in the case of a speed change error can be shortened to thereby reduce the sensation of free running.

In this embodiment, since the speed change error determination time is started to be counted based not on the second pedal load threshold Lt2 which triggers the start of preloading control of the main clutch 22 but on the pedal load threshold Lt which triggers the start of disengagement of the main clutch 22, it is possible to prevent the determination of a speed change error from being made erroneously when the vehicle is running at low speeds where a speed change action is performed slowly.

The invention is not limited to the embodiment which has been described heretofore and hence can be modified or improved as required.

For example, not only the strain sensor but also an arbitrary sensor can be used for the pedal load sensor 108.

When the change pedal 106 is operated to execute an upshifting operation in acceleration of the vehicle, the engine cooperative change control and the clutch capacity (fluid pressure) control may be executed simultaneously, whereby a speed change can be executed more smoothly.

DESCRIPTION OF REFERENCE NUMERALS AND CHARACTERS

10 Variable speed control system
12 Transmission (Multiple speed transmission)
22 Main clutch
90 Dog clutch
106 Change pedal
108 Pedal load sensor (Pedal load detection device)
130 ECU (Control unit)
132 Throttle position sensor (Throttle position detection device)
136 Engine revolution speed sensor (Engine revolution speed detection device)
De Throttle position (Detected position)
Ld Pedal load (Detected load)
Lt Pedal load threshold (Threshold)
Ne Engine revolution speed (Detected revolution speed)
T Reference time

The invention claimed is:

1. A variable speed control system (10), comprising:
a multiple-speed transmission (12) which changes a speed of an engine output in multiple stages based on a change in meshing state of a dog clutch (90) which is caused in association with an operation of a change pedal (106) connected mechanically;
a pedal load detection device (108) which detects an operation load of the change pedal (106); and
a control unit (130) which suppresses or shuts off an engine output to the multiple-speed transmission (12) and permits a speed change action of the multiple-speed transmission (12) by means of the change pedal (106) when a detected load (Ld) of the pedal load detection device (108) exceeds a predetermined threshold (Lt),
wherein the variable speed control system (10) further comprises an engine revolution speed detection device (136) which detects an engine revolution speed, and
wherein the control unit (130) changes the threshold (Lt) according to a detected revolution speed (Ne) by the engine revolution speed detection device (136).

2. The variable speed control system (10) according to claim 1,
wherein the control unit (130) changes the threshold (Lt) which is increased as the detected revolution speed (Ne) of the engine revolution speed detection device (136) rises.

3. The variable speed control system (10) according to claim 1,
wherein the control unit (130) changes the threshold (Lt) continuously according to the detected revolution speed (Ne) of the engine revolution speed detection device (136).

4. The variable speed control system (10) according to claim 1,
wherein the multiple-speed transmission (12) has a neutral position between a first gear and a second gear, and
wherein the control unit (130) sets the threshold (Lt) greater in a speed change action from the first gear to the second gear and/or in a speed change action from the second gear to the first gear than in other speed change actions.

5. The variable speed control system (10) according to claim 1,
wherein the variable speed control system (10) further comprises a throttle position detection device (132) which detects a position of a throttle valve, and
wherein the control unit (130) changes the threshold (Lt) according to not only the detected revolution speed (Ne) of the engine revolution speed detection device (136) but also a detected position (De) of the throttle position detection device (132).

6. The variable speed control system (10) according to claim 1,
wherein in shutting off an engine output to the multiple-speed transmission (12) by disengaging a main clutch (22) when the detected load (Ld) of the pedal load detection device (108) exceeds the threshold (Lt), the control unit (130) sets a second threshold (Lt2) which is smaller than the threshold (Lt) and controls the main clutch (22) preloaded in preparation for disengagement when the detected load (Ld) of the pedal load detection device (108) exceeds the second threshold (Lt2).

7. The variable speed control system (10) according to claim 6, wherein the control unit (130) engages the main clutch (22) in an event that a speed change action of the multiple-speed transmission (12) is not completed even though a predetermined reference time (T) has elapsed after the main clutch (22) is disengaged according to an operation of the change pedal (106).

8. The variable speed control system (10) according to claim 7,
wherein the control unit (130) starts counting the reference time (T) at a timing that the detected load (Ld) of the pedal load detection device (108) exceeds the threshold (Lt).

* * * * *